US011778370B2

(12) United States Patent
Wang et al.

(10) Patent No.: US 11,778,370 B2
(45) Date of Patent: Oct. 3, 2023

(54) MICROPHONE ARRAY ONBOARD AIRCRAFT TO DETERMINE CREW/PASSENGER LOCATION AND TO STEER A TRANSDUCER BEAM PATTERN TO THAT LOCATION

(71) Applicant: Gulfstream Aerospace Corporation, Savannah, GA (US)

(72) Inventors: Tongan Wang, Savannah, GA (US); Scott Bohanan, Savannah, GA (US); Jim Jordan, Savannah, GA (US); Matthew Wallace, Savannah, GA (US)

(73) Assignee: Gulfstream Aerospace Corporation

( * ) Notice: Subject to any disclaimer, the term of this patent is extended or adjusted under 35 U.S.C. 154(b) by 381 days.

(21) Appl. No.: 17/247,314

(22) Filed: Dec. 7, 2020

(65) Prior Publication Data
US 2022/0182756 A1    Jun. 9, 2022

(51) Int. Cl.
*H04R 1/40*    (2006.01)
*B64D 11/00*   (2006.01)
*G10L 21/0216* (2013.01)
*H04R 3/00*    (2006.01)

(52) U.S. Cl.
CPC ......... *H04R 1/406* (2013.01); *B64D 11/0015* (2013.01); *H04R 1/403* (2013.01); *G10L 2021/02166* (2013.01); *H04R 3/005* (2013.01); *H04R 2201/401* (2013.01); *H04R 2499/13* (2013.01)

(58) Field of Classification Search
CPC .... B64D 11/0015; B64D 11/00; H04R 1/403; H04R 1/406; H04R 3/005; H04R 1/40; H04R 3/00; H04S 7/303; H04L 12/28

USPC ............................................ 381/86, 92
See application file for complete search history.

(56) References Cited

U.S. PATENT DOCUMENTS

| 2006/0262935 A1 | 11/2006 | Goose et al. |
| 2007/0038444 A1 | 2/2007  | Buck et al. |
| 2016/0286316 A1 | 9/2016  | Bleacher et al. |
| 2018/0146285 A1 | 5/2018  | Benattar et al. |

FOREIGN PATENT DOCUMENTS

| CN | 202110470482 | * | 4/2021 | ............... H04R 3/00 |
| JP | 2018512619   | * | 5/2018 | ............. G10L 15/28 |

* cited by examiner

*Primary Examiner* — Yosef K Laekemariam
(74) *Attorney, Agent, or Firm* — LKGlobal | Lorenz & Kopf, LLP (57) ABSTRACT

Audio content is controllably directed to or from an aircraft occupant, such as the pilot or a passenger using a microphone array of at least two transducers, positioned onboard an aircraft to pick up utterances of the aircraft occupant. An electronically steerable transducer array coupled to an onboard an aircraft audio system, such as an avionics communication system or in-flight entertainment system supplies audio content to the aircraft occupant. A signal processor coupled to the microphone array processes utterances sensed by the transducers using a time of arrival algorithm to determine an utterance originating direction. A controller circuit then supplies a pointing direction control signal to the steerable beamforming speaker array or microphone array based on the utterance originating direction to cause the steerable transducer array to direct the audio content in the direction of the sensed utterance and thereby direct the audio content to or from the aircraft occupant.

20 Claims, 6 Drawing Sheets

MICROPHONE ARRAY ONBOARD AIRCRAFT TO DETERMINE CREW/PASSENGER LOCATION AND TO STEER A TRANSDUCER BEAM PATTERN TO THAT LOCATION

TECHNICAL FIELD

The disclosure relates generally to audio sound systems for aircraft and more particularly to an electrically steered speaker or microphone array that projects or receives sound in the direction of a user, by detecting the sound of the user's voice.

BACKGROUND

This section provides background information related to the present disclosure which is not necessarily prior art.

The interior of the modern business aircraft defines an elongated tubular acoustic space. The pilot and copilot sit on the flight deck at the nose of the aircraft, where the flight controls and avionics are located. The remainder of the occupied space is typically outfitted with seating areas, on-board entertainment systems, sleeping areas, lavatory and the like.

Conventionally, it has been customary to use headsets at each occupant seating position. The pilots use over-the-ear headsets with an attached boom mic used to communicate with air traffic control over the avionics communication system. The passengers are typically issued less elaborate headsets, used primarily to enjoy the in-flight entertainment system. In some cases, speakers placed above or near the passenger may be used instead of headsets.

Headsets have the advantage of being able to muffle the ambient aircraft aerodynamic and engine noise, but at the expense of comfort. Some people consider headsets to be inconvenient or uncomfortable to wear when worn for long periods of time.

SUMMARY

The disclosed system and method captures direction of arrival information from the spoken utterance of a pilot or aircraft passenger and uses that information to steer the beam pattern of a transducer array, such as a speaker array or microphone array. In the case of a steered speaker array, the direction of arrival information is used to focus or steer the output of the speaker array in the direction of the spoken utterance, thereby allowing the pilot or passenger to hear more clearly. In the case of a steered microphone array, the direction of arrival information is used to train the microphone array's reception pattern in the direction of the spoken utterance, thereby improving speech intelligibility of the pilot or passenger—which can be particularly helpful in a noisy aircraft environment. The direction of arrival information from the spoken utterance is also useful in control of cabin control systems, such as lighting, window shade control, in-flight entertainment system control and the like. In such application, the direction of arrival information allows the controlled system to apply control over a particular location within the aircraft, such as the location where the pilot or passenger is seated. Thus, for example, a voiced command to lower an automated window shade would be applied to the window shade proximate the location from which the spoken utterance originated.

The disclosed system and method can eliminate the need to wear uncomfortable headsets, for both pilots and passengers. In one embodiment the system uses electrically steerable speaker arrays, deployed at each of the seating or potential listening locations. In one embodiment the electrically steerable speaker array employs phased array techniques to focus enhanced sound pressure levels in the steered beam pointing direction, while supplying considerably reduced sound pressure levels at angles outside the beam. In one embodiment the speaker array is implemented using ultrasonic transducers which are driven with an ultrasonic (inaudible to the human ear) carrier which is modulated with the audio program content.

In order to steer the speaker array to the position occupied by a user, the system employs clusters of spaced apart microphone transducers, deployed throughout the aircraft, in the vicinity of each seating position or other commonly occupied location. When an occupant speaks, his or her voice is detected by a nearby cluster of transducers, and the system utilizes a signal processor, programmed with a direction-of-arrival algorithm to locate the position of the speaking occupant. This position is then fed to the steerable speaker array to cause the steered beam to point in the speaking user's direction.

Due to the comparatively narrow beam width of each speaker array, the occupant at whom the speaker is now directed will hear the audio program content, while occupants in other locations within the aircraft will not. In a properly equipped aircraft, this "private speaker" effect is enhanced by outfitting the aircraft with sound absorbing materials on the interior wall surfaces, bulkhead surfaces and carpeted flooring.

The disclosed system and method is well suited for use on the flight deck, allowing pilots to hear communications with air traffic control, avionics warning systems, and private intercom communications, and the like, without wearing headsets and without annoying the passengers. Similarly passengers can selectively enjoy in-flight entertainment program content of their choosing, without wearing headsets and without annoying the other passengers, who may be listening to a different entertainment program or trying to sleep.

According one aspect, the disclosed method controllably directs audio content to an aircraft occupant by receiving sounds within the aircraft using a microphone array of at least two transducers. The received sounds are processed to extract a human utterance and direction of arrival analysis is performed on the extracted human utterance to determine an utterance originating direction. The utterance originating direction is used to electronically steer a speaker array towards the utterance originating direction. Using the speaker array, audio content is then directed from an aircraft audio system to the aircraft occupant from whom the extracted human utterance originated.

According to another aspect, the disclosed system controllably directs audio content to an aircraft occupant. A microphone array, of at least two transducers, is positioned onboard the aircraft to pick up utterances of the aircraft occupant. An electronically steerable speaker array, coupled to an onboard an aircraft audio system, supplies audio content to the aircraft occupant. A signal processor is coupled to the microphone array to process utterances sensed by the at least two transducers to determine an utterance originating direction of the sensed utterance. A controller circuit then supplies a pointing direction control signal to the steerable speaker array, based on the utterance originating direction to cause the steerable speaker array to direct the audio content in the direction of the sensed utterance and thereby direct the audio content to the aircraft occupant.

According to another aspect, the disclosed system controls an aircraft cabin system of the type providing functionality at plural different selectable locations. A microphone array of at least two transducers receives sounds with the aircraft. These received sounds are processed to extract a human utterance. Direction of arrival analysis is then performed on the extracted human utterance to determine an utterance originating direction. Using the utterance originating direction, the cabin system is caused to provide functionality at at least one selected location based on the utterance originating direction.

BRIEF DESCRIPTION OF THE DRAWINGS

The drawings described herein are for illustrative purposes only of selected embodiments and not all possible implementations. The particular choice of drawings is not intended to limit the scope of the present disclosure.

DETAILED DESCRIPTION

Figure 1:
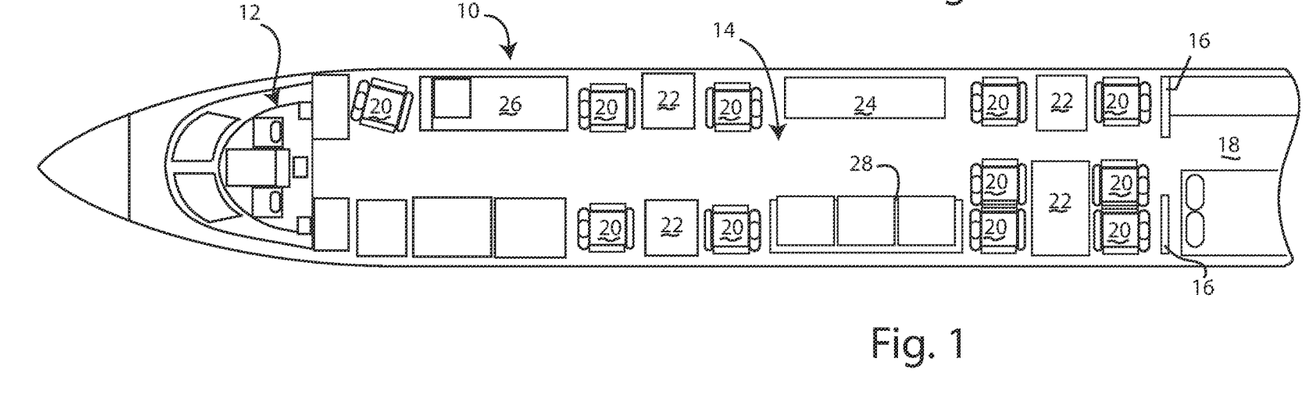
FIG. 1 is a plan view of a portion of the occupied space within an exemplary business aircraft, illustrating some of the locations where the microphone arrays and steerable speaker arrays may be deployed.

Referring to FIG. 1 the interior plan cabin layout of an exemplary business aircraft is shown at 10. The flight deck 12 occupies the fore portion of the interior space within the nose of the aircraft, while the remainder of the occupied interior space is utilized for passenger quarters 14, including quarters for the flight attendant crew. The walls and ceiling of the interior space may be treated with sound absorbing material, and the floor will likewise be provided with carpeting, which also acts as a sound absorber. Different portions of the cabin may be partitioned by bulkheads to define different functional areas. For example, in FIG. 1 bulkheads are provided at 16 to define a more private sleeping quarters 18.

Depending on the intended use of the aircraft, an assortment of passenger seats 20 and workspace and dining tables 22 are deployed throughout the cabin. Individual in-flight entertainment system monitors, such as drop down, ceiling mounted monitors, are provided for each of the passenger seats and divan 26. In the illustrated cabin layout, a large screen in-flight entertainment system monitor 24 is positioned across from a sofa 28, to allow several people to view the monitor at the same time.

Figure 2:
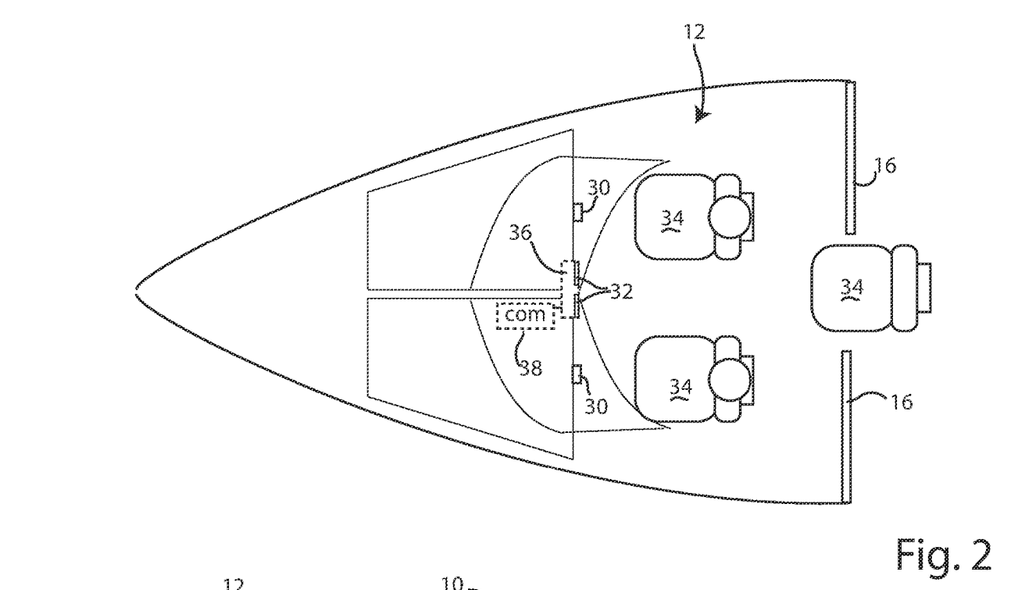
FIG. 2 is a plan view of the flight deck of the aircraft of FIG. 1, showing in greater detail an exemplary placement of the microphone arrays and steerable speaker arrays for a pilot and copilot.

Deployed on suitable structures in proximity to each of the occupied areas within the passenger quarters, galley, lavatory and flight deck are miniature microphone arrays 30 and speaker arrays 32 (not shown in FIG. 1; but shown at exemplary locations in FIG. 2). As will be further explained, the microphone arrays are positioned to pick up utterances (e.g., human speech) from the passengers, pilots and other crew. Signal processing circuitry analyzes these received utterances to determine the position at which the utterance originated. This information is then used by a beam steering system to electronically steer the beam of a nearby speaker array. The same information will also be used to steer the beamforming microphone array to enhance speech intelligibility of the passenger in a noisy environment. Thus the system is able to supply audio content directly to or from the location of each occupant. In FIG. 2 the relative placement of microphone arrays 30 and speaker arrays 32 have not necessarily been drawn to scale and the actual installed locations may change in practice, as the actual placement of these components may depend on where suitable mounting structures are located on the flight deck.

Referring to FIG. 2, the flight deck 12 is separated from the passenger quarters by bulkhead 16. In the illustrated example, three pilot seats 34 are provided, for pilot, copilot and an auxiliary pilot. Mounted in a suitable location on the instrument panel is a microphone array 30 (illustrated are two such arrays, one for pilot and one for copilot). Also suitably mounted is a speaker array 32 (illustrated are two such arrays, one for pilot and one for copilot). The electronic package for implementing the audio directing system 36 is shown diagrammatically in FIG. 2. Also illustrated diagrammatically at 38 is the avionics communication system that provides radio communication between the pilots and air traffic control and other services, including intercom communication with crew, and also provides audible warning and alert messages. This avionics communication system supplies audio content through the speaker arrays 32 positioned in front of the pilots.

Figure 3:
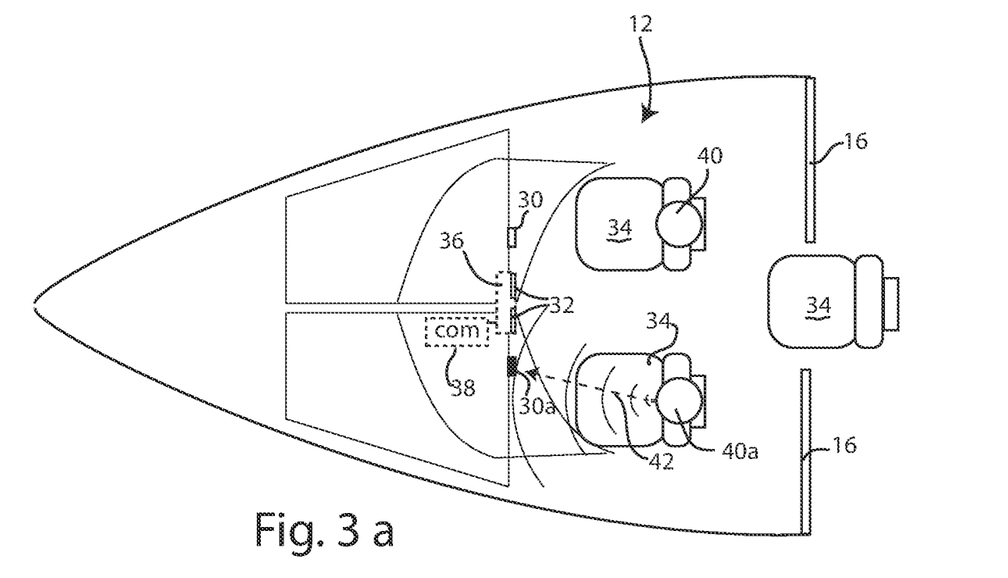
FIGS. 3a and 3b diagrammatically illustrate the sequence by which a pilot utterance is detected and used to steer the speaker array in the direction of that pilot.

FIGS. 3a and 3b illustrate how the audio directing system functions. As shown in FIG. 3a, the pilot 40a utters a spoken message which propagates as utterance 42 where it is received by microphone array 30a. The electronic audio directing system 36 processes the received utterance to determine the direction from which the utterance originated, and then uses that originating direction to electronically steer the acoustic output of speaker array 32 (located nearest pilot 40a) in the direction of pilot 40a. As illustrated in FIG. 3b, having now been steered to direct its acoustic energy at the pilot, the speaker array 32 transmits subsequent audio content from the avionics communication system 38 as a beam 44 of acoustical energy to that pilot. The audio directing system 38 may be configured to perform a sample and hold function whereby, having learned the location of a person from his or her utterance, the system will maintain the speaker array 32 trained on the learned location, unless a subsequent utterance dictates that the beam direction should be adjusted.

Figure 4:
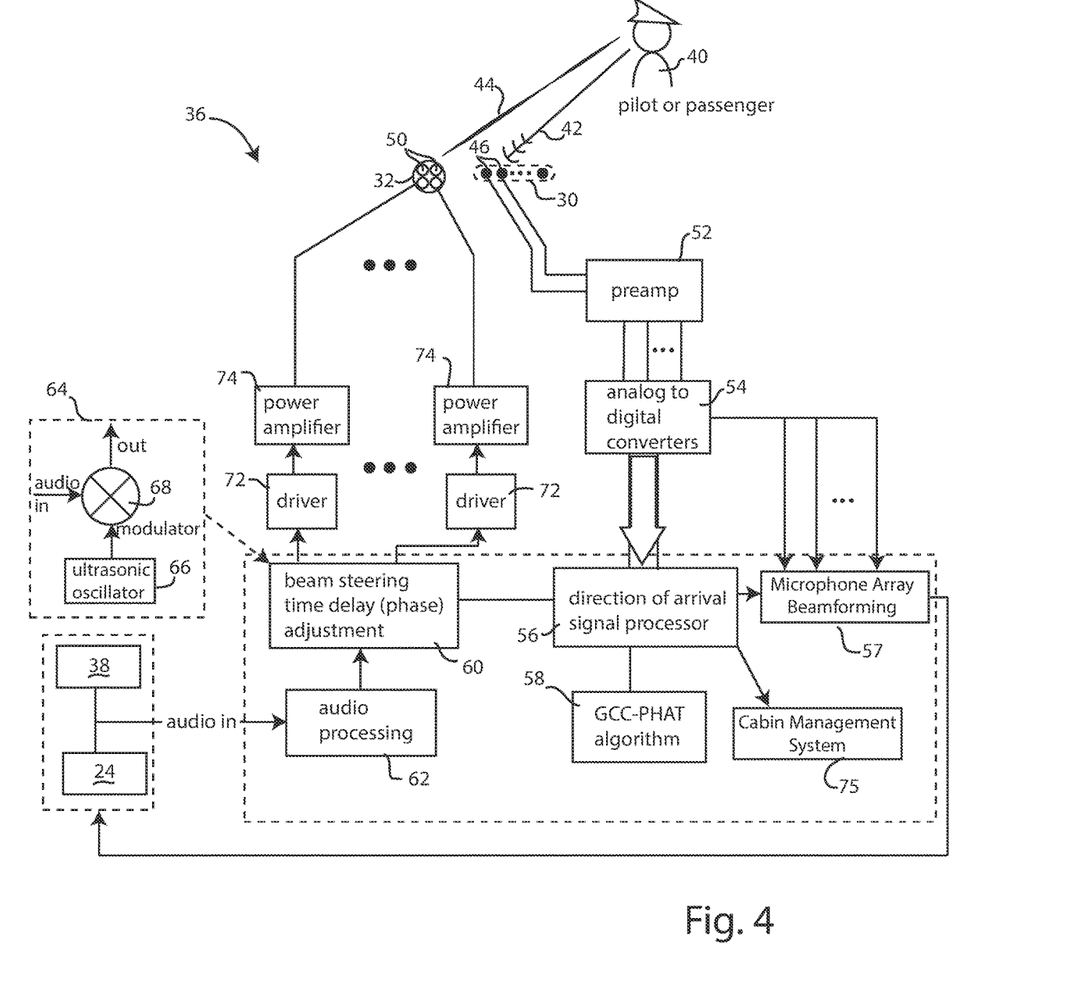
FIG. 4 is a block diagram illustrating how a microphone array and speaker array system may be combined with signal processing to steer the beamforming speaker array or beamforming microphone array pointing direction based on detected utterance.

Referring to FIG. 4, the audio directing system 36 is shown in greater detail. In a steered speaker mode, the system is designed to direct audio content from speaker array 32 to an occupant of the aircraft, such as pilot or passenger 40, after sensing the occupant's direction or position by determining the originating direction of an utterance 42 spoken by the occupant. In a focused microphone mode, the system is also designed to focus a beamforming microphone array 30 (comprising plural microphone transducers 46) in the direction of the occupant after sensing the occupant's direction or position. The steered speaker and focused microphone applications may be utilized together if desired.

As previously discussed, the utterance 42 is picked up by a microphone array 30 comprising a plurality of individually addressable (independently monitored) microphone transducers 46 arranged in a predetermined grouping of known location and spacing. The speaker array 32 also comprises a plurality of individually addressable speaker transducers 50 of known location and spacing.

The individual microphone transducers 46 are each coupled to a multichannel preamplifier 52, which amplifies the respective outputs of each microphone 46 transducer to a suitable level to drive the multichannel analog to digital (A to D) converters 54. Because the audio directing system relies on time of arrival detection, the preamplifier 52 and analog to digital converter circuit 54 should be configured to introduce equal phase delay (or time delay), if any, on all channels. This will ensure that the relative time of arrival measurements are accurately determined, to ensure that the calculated time differences are accurate. This can be accomplished, in part, by careful component selection to match the impedance of the microphone transducers, and to minimize capacitive or inductive differences among channels, and by ensuring that electrical signal path lengths are the same for all channels. It is also possible to implement the system using microphone transducers that have a digital output, which do not require an analog to digital converters.

The multichannel A to D convertors 54 supply digital representations of each microphone transducer output to the signal processor 56, which uses a direction-of-arrival algorithm to determine the position or location of the utterance origin. The signal processor 56 is programmed to correlate and compare the sounds received by the transducers of the microphone array 30 to determine the time for the same utterance to arrive at each transducer. From these determined times, a time difference dt is calculated.

Figure 5:
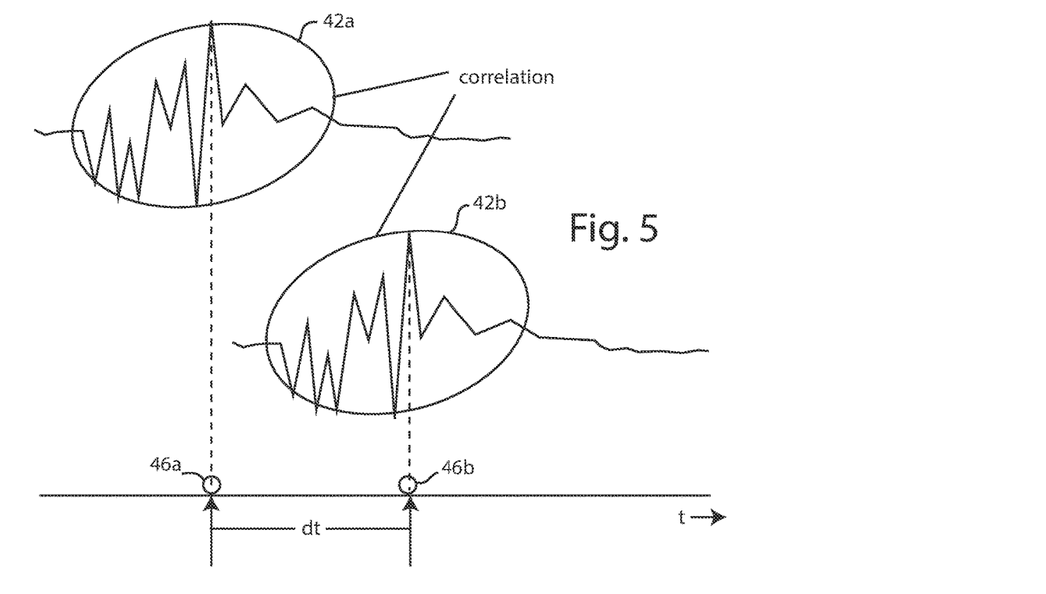
FIG. 5 is a waveform diagram illustrating how different time of arrival of the same uttered signal can be measured.

As illustrated diagrammatically in FIG. 5 utterance 42a arrives at a first transducer 46a before utterance 42b arrives at transducer 46b. The signal processor performs correlation on the sounds received by each transducer, in order to identify that utterances 42a and 42b represent the same utterance event, simply received at different times. By subtracting the arrival times of the respective received utterance signals, the time difference dt is computed by the processor. The position or location of the utterance origin is then calculated from this calculated time difference dt.

Figures 6, 7:
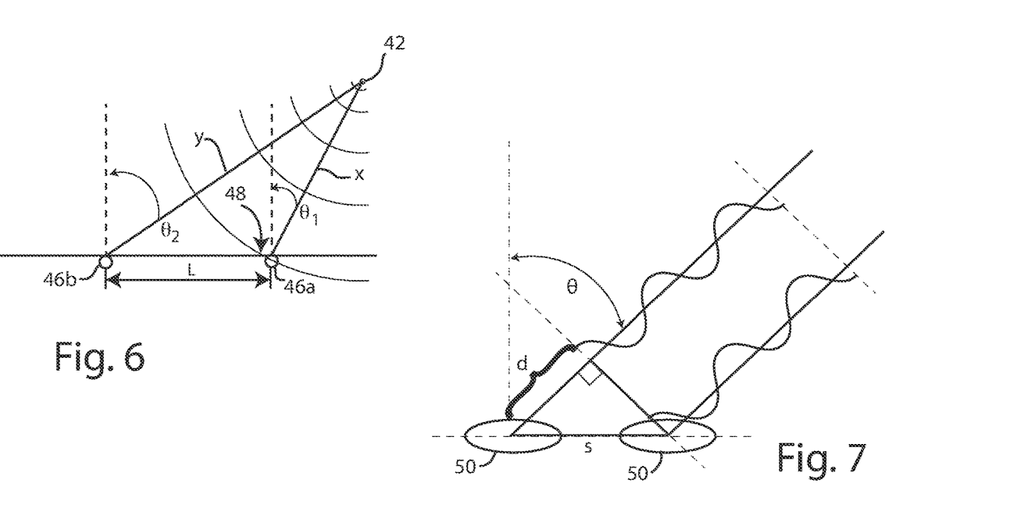
FIG. 6 is a diagram illustrating how the geometric origin of the wavefront of the uttered sound may arrive at the pair of microphone transducers from different apparent angles.
FIG. 7 is a diagram illustrating how the phasing (inserted time delay) of a pair of speaker transducers within the speaker array can affect the beam pointing direction through constructive and destructive interference.

FIG. 6 illustrates how the computed difference dt in arrival times at the transducers 42a and 42b may be used to determine not only general direction from which the utterance came, but also, through triangulation, the precise position or location of the origin of the utterance 42. In FIG. 6, the utterance originates at 42 and acoustically propagates in a spherical wavefront, depicted by the expanding arced lines in FIG. 6. As illustrated, the wavefront at 48 passes across and is received by transducer 46a, before it passes across and is received by transducer 46b. The spacing L between transducers 46a and 46b is fixed. Thus the line-of-sight distance x from the utterance origin 42 to transducer 46a is shorter than the line-of-sight distance y, by an amount equal to the additional distance the wavefront propagated to 46b during the calculated delay time dt. In other words, the distances from the utterance origin 42 to the respective transducers 46a and 46b can be related knowing the calculated or measured time delay dt and the speed of sound c within the aircraft cabin, as follows:

$$y = x + dt \times c$$

Having calculated the distances x and y, and knowing the fixed spacing L, as well as the known locations of microphone transducers 46a and 46b, the direction and position of the utterance origin 42 can be determined. If desired, the position of the utterance origin can be expressed using an angular measure. In FIG. 6, such angular measures are shown at $\theta 1$ and $\theta 2$ measured relative to a line orthogonal to the plane in which the transducers 46a and 46b lie. It will be appreciated that FIGS. 5 and 6 are intended simply to show conceptually how the utterance origin is related to the arrival time at plural transducers whose position and spacing are known. There are a variety of computational techniques that may be used to determine direction of arrival, and spatial position or location of the utterance origin. One embodiment of doing so is to program the processor to identify the utterance origin by maximizing the generalized cross correlation phase transform (GCC-PHAT) function, discussed below.

Focused Microphone Mode

Returning to FIG. 4, the processor 56 uses the calculated utterance origin calculation to supply direction of arrival instructions to the microphone array beamforming delay adjustment processor 57. This inserts time delays or phase changes to selected ones of the incoming signals from the analog to digital converters 54, to cause the microphone array to operate as steered beamforming array, which directs or focuses the microphone array pickup pattern to enhance sound pickup in the direction of the utterance origin. The output of the microphone array beamforming delay adjustment processor 57 is fed as an audio input source as at 24 and 38. In this way, audio signals picked up by the microphone array 30 will favor sound pickup in the direction in which the beam has been actively focused. As noted above, the focused microphone mode may be utilized concurrently with the steered speaker mode.

Steered Speaker Mode

Returning to FIG. 4, the processor 56 uses the calculated utterance origin calculation to supply instructions to the beam steering circuit or signal processing operation 60. Actual steering of the acoustic beam is performed without the need for physical reorientation of the speaker transducers 50 or microphone array 30. Rather, the beam is steered electrically by introducing timing or phasing differences in the audio signals being fed to each individual transducer. These phase-shifted or time-shifted audio signals are supplied to the individual speaker transducers 50 of speaker array 32 through suitable driver circuits 72 and power amplifiers 74. Note that the phase-shifted or time-shifted audio signals are delivered in parallel to the speaker transducers of the speaker array. Care should be taken that driver circuits 72 and power amplifiers 74 introduce equal phase delay (or time delay), if any, on all channels. This will ensure that the proper constructive and destructive interference will occur in order to steer the beam correctly. This can be accomplished, in part, by careful component selection to match the impedance of the speaker transducers, and to minimize capacitive or inductive differences among channels, and by ensuring that electrical signal path lengths are the same for all channels.

The beam steering circuit or process 60 is essentially delivering the audio content from the avionics communication system 38 (for the pilots) or from the in-flight entertainment system 24 (for the passengers), after inserting a calculated time delay for each channel to effect beam steering. If not already in the digital domain, the audio inputs from the avionics communication system 38 and the in-flight entertainment system 24, may be converted through analog to digital conversion in the audio processing circuit 62.

Modulated Ultrasonic Beam Embodiment

If desired, a more directional (narrower) beam 44 can be achieved using an ultrasonic speaker system, which may be implemented as part of the audio processing circuit 62 as illustrated by the dashed box 64 in FIG. 4. In this embodiment, the audio input from the avionics communication system 38 and/or the in-flight entertainment system 24, after having been processed by the beam steering adjustment 60, is supplied to a modulator circuit 68, which modulates the audio program content onto an ultrasonic carrier supplied by ultrasonic oscillator 66. One such modulator circuit is employed to feed each of the driver 72 circuits, so that each transducer transmits an ultrasonic signal with the appropriate time delay (phase adjustment). In this way, the speaker array produces an ultrasonic beam having an ultrasonic carrier wave at a frequency that is inaudible to the human ear. The system audio is modulated upon this ultrasonic carrier wave and thus travels with the carrier wave in the direction of the beam. As the beam passes through air molecules in route to the listener's ears, the modulated wave becomes naturally demodulated through interaction with the air molecules. Because of this natural demodulation, the listener is able to hear the demodulated audio signal, sounding much as if it had come from a conventional speaker.

Controlling Speaker Beam Direction

The signal processor 56 uses the arrival time delay between the microphone transducer signals to electronically steer the beam 44 in the direction of the person whose utterance was received. This is accomplished by inserting a controlled delay.

To better understand how beam steering is accomplished, refer to FIG. 7, which illustrates two speaker transducers 50 arranged in a linear array. When both speakers are fed coherently with the same audio signal, the sound waves emanating from each speaker are in phase and the sound will appear to come straight on from the plane of the speakers, i.e., from a direction perpendicular to the horizontal axis (as seen in FIG. 7).

However, when one of the speakers is fed by a signal that is delayed by a time increment dt, constructive and destructive interference between the respective wavefronts of the two speakers will produce the loudest collective sound in an angled direction, no longer perpendicular but at an angle θ to the horizontal axis, as shown in FIG. 7. The angled direction can be computed trigonometrically, by knowing the wavelength of the audio frequency. Frequency (f) and wavelength λ are related the speed of sound c, according to the following equation:

$$f = c/\lambda$$

To steer the beam in the direction (angle θ) illustrated in FIG. 7, the signal from speaker on the left (in FIG. 7) is delayed by a time dt computed to account for the fact that the signal from speaker on the left (in FIG. 7) must traverse the additional distance d, in order for its wavefront to be in phase with the wavefront from the speaker on the right (in FIG. 7). This delay dt can be computed for a given angle θ using the following trigonometric relationship:

$$dt = s \sin(\theta)/c$$

where s is the speaker separation and c is the speed of sound at the ambient temperature.

Programmed Processor Implementation

Figure 8:
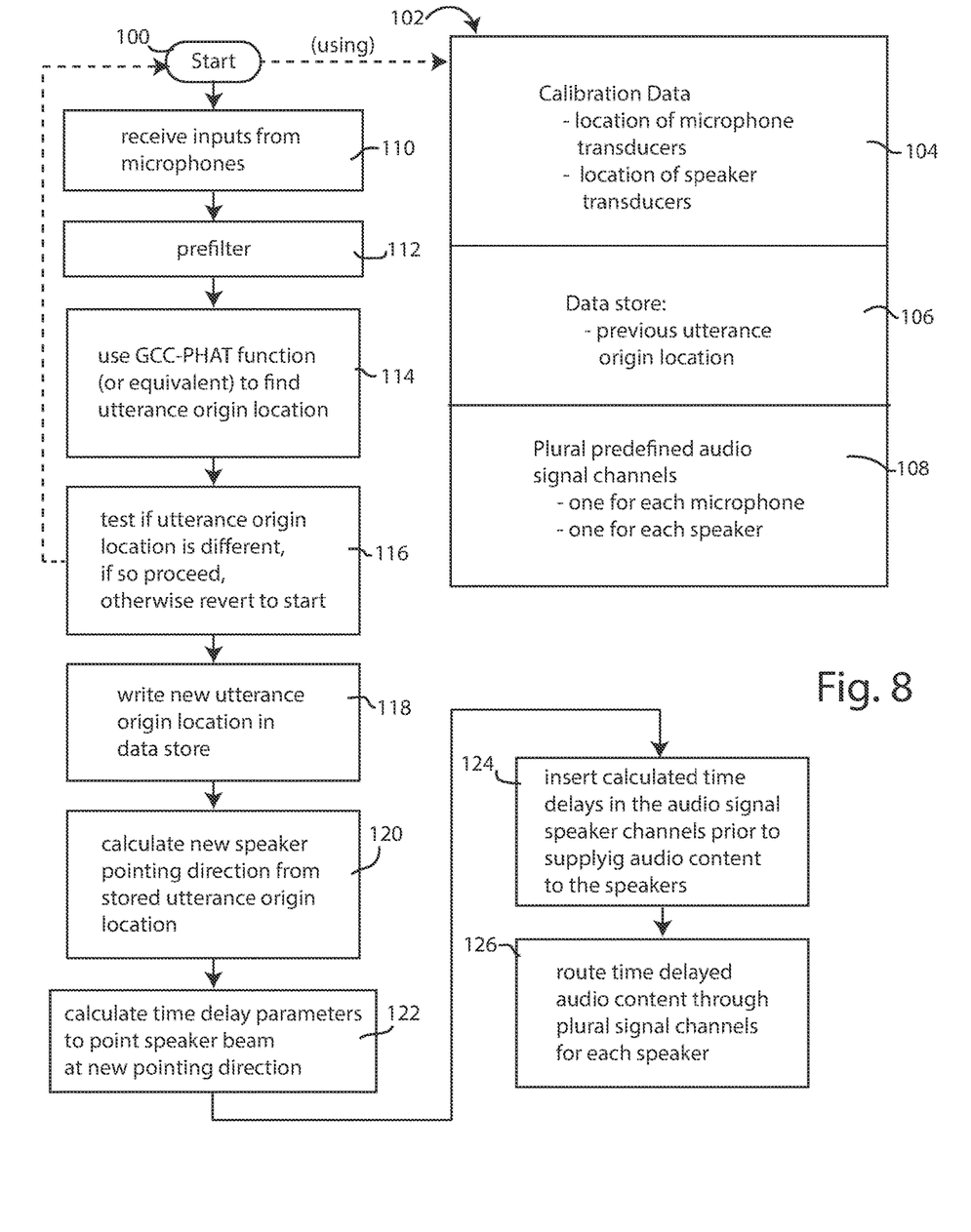
FIG. 8 is a flowchart useful in understanding how a programmed processor may implement the audio directing system.

FIG. 8 illustrates one exemplary embodiment of the steps the processor is programmed to perform, beginning at 100. Although the processor is depicted as a sequential series of steps, the operations may be performed in parallel, if desired.

The processor uses memory 102 configured to store calibration data 104, used to give the processor knowledge of the locations of microphone transducers and speaker transducers. Alternatively, the transducer locations can be hardcoded in the firmware or software, if desired. The memory 102 also provides a data store 106 used to store the last used (previous) utterance origin location. The processor uses this stored location to compute speaker pointing direction, updating the stored value as needed if the speaker moves—effectively implementing a sample and hold function. Memory 102 is also used to define plural predefined audio channels 108, including a set of channels for each microphone transducer and a set of channels for each speaker transducer. These are digital audio channels, storing digital audio from the microphones and from the avionics communication system 38 or in-flight entertainment system, in suitably sized buffered memory locations upon which the processor can operate to manipulate the data.

The processor receives inputs from the microphones at 110 and applies a prefilter at 112. As discussed below, the prefilter can be used to inhibit or reject sounds received by the microphones that do not have qualities of human speech. The processor applies a time of arrival algorithm or function upon the prefiltered (human speech utterance) data, at 114, to find the utterance origin location. In one embodiment a GCC-PHAT function is used.

The processor at 116 tests if the utterance origin location is substantially different from the value previously stored in data store 106. If so, the processor proceeds to step 118, writing the new utterance origin location in data store 106. If not, the processor reverts to start 100.

From the utterance origin location value stored in data store 106, the processor, at step 120, calculates a new speaker array pointing direction. See FIG. 6. This new pointing direction is then used by the processor, at 122, to calculate time delay parameters that will cause the speaker beam to point at the new pointing direction. See FIG. 7. The processor uses these calculated time delay parameters, at step 124, to insert time delays in the audio channels for each speaker, as applicable. This is done by operating on the digital audio data buffered in the audio channels, to reposition certain data for delayed playback (relative to other audio channels). The time-delay processed audio data are supplied as audio content through the plural signal channels for each speaker.

Generalized Cross Correlation Phase Transform (GCC-PHAT)

With reference to FIG. 4, in one embodiment processor 56 is programmed to perform time of arrival detection to determine the utterance origin (position and/or direction) by maximizing the generalized cross correlation phase transform (GCC-PHAT) function 58. This compares the signals received from two spatially separated microphone transducers by applying them to a cross correlator having an adjustable time component that establishes a time delay in one signal relative to the other. The two signals are then multiplied together and integrated for a variety of different delay combinations by programmatically or algorithmically adjusting the time component until the maximum peak is discovered. The time component delay at which this maximum peak is achieved corresponds to a maximum likelihood estimation of the arrival time delay between the two signals.

Figure 9:
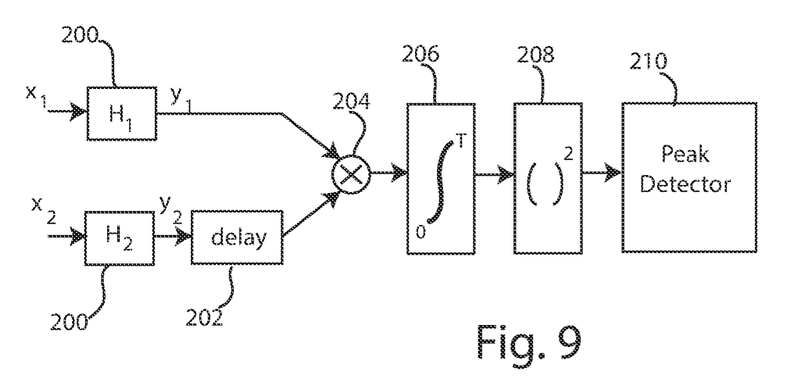
FIG. 9 is a block diagram useful in understanding GCC-PHAT maximum likelihood estimation technique for direction-of-arrival analysis.

FIG. 9 illustrates the basic maximum likelihood estimation principle. The two microphone signals $x_1$ and $x_2$ are applied to filters 200 having filter functions $H_1$ and $H_2$. One of the two signal paths is delayed (as at 202). The signals are then multiplied together at 204, integrated at 206 and squared at 208 to develop a composite signal that is analyzed by peak detector 210. The two microphone signals are processed in this fashion, while adjusting the delay applied at 202 until the maximum peak is discovered at the peak detector. The process implements a maximum likelihood estimator comprising the pair of receiver prefilters followed by a cross correlator. The time argument at which the correlator achieves a maximum is the delay estimate.

Different filter functions or transforms may be used for filters 200. In the described embodiment a Phase Transform (PHAT) has been used. Other filter alternatives may be substituted. If desired the GCC-PHAT function can be implemented using Matlab gccphat(sig, refsig) function.

Prefiltering

The GCC-PHAT function used by the signal processor 56 is fairly robust in the presence of background noise, assuming the background noise is relatively uncorrelated. However, to enhance utterance detection and to avoid false triggers, the signal processor 56 may also include one or more audio prefilters to process the microphone transducer data prior to time of arrival estimation (GCC-PHAT). Such prefiltering may include frequency band filtering, where microphone transducer signals outside the normal human speech frequency range are suppressed. To further improve scalability, different pairs of the microphone array can be used to derive a more reliable estimate of the direction of arrival.

Such prefiltering may also include mel-frequency processing, which approximates the human auditory system's response more closely than the linearly-spaced frequency bands. In addition, prefiltering may also include time-window processing whereby the incoming stream of data from the microphone transducers sampled into time windows that correspond to the natural duration of human phonetics, allowing the processor to suppress time of arrival estimation processing on signals which may comprise the same frequencies as human speech but which do not exist over timeframes comparable to human speech.

In more advanced systems, prefiltering may also include speech recognition processing, whereby the processor tests whether a received signal generates a sufficiently high likelihood score from a speech recognizer algorithm to conclude that the signal is human speech. In this case it is not necessary for the recognizer to decode the utterance into text, but merely to determine that the received sounds bear a high probability of being human speech. Combinations of these and other similar filters may also be used.

Cabin System Control Mode

In addition to the steered speaker and focused microphone modes, the direction of arrival signal processor 56 (FIG. 4) may also be interfaced with the on-board cabin management system 75 to provide focused, positional control over these systems.

In a modern business aircraft there are many passenger convenience systems, including an in-flight entertainment system, lighting control, automated window shade control, and the like. These systems will typically provide selectable functionality at a plurality of different, discrete locations throughout the aircraft. For example, individual task lighting is provided above each seating location, in addition cabin lighting to provide ambient light and to light the aisles. Such lighting may be equipped with dimmable on-off control and optionally color temperature control. In such a lighting system, passengers want the ability to control the lighting for their location, without affecting the lighting for other passengers. The same is true for automated window shades, and the in-flight entertainment system.

To provide each passenger with individual, focused control over their space within the aircraft, the direction of arrival information, the direction of arrival processor 56 provides the cabin management system 75 with location information on each passenger. Thus when the passenger wishes to control a cabin management system, the system knows where that passenger is located, so that the control commands are restricted to the appropriate location where the passenger is situated. If desired, the cabin management system 75 may be operable using voiced commands. Thanks to the direction of arrival information from processor 56, the control system does not need to have the passenger locations programmatically specified in advance.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. A method of controllably directing audio content to or from an aircraft occupant comprising:
   receiving sounds within the aircraft using a microphone array of at least two transducers;
   processing the received sounds to extract a human utterance;
   performing direction of arrival analysis of the extracted human utterance to determine an utterance originating direction;
   using the utterance originating direction to electronically steer a transducer array towards the utterance originating direction;
   using the transducer array to direct audio content to or from the aircraft occupant from whom the extracted human utterance originated.

2. The method of claim 1 wherein the transducer array is a beamforming speaker array and further comprising using the speaker array to direct audio content from an aircraft audio system to the aircraft occupant from whom the extracted human utterance originated.

3. The method of claim 1 wherein the transducer array is a beamforming microphone array that is electronically steered to improve speech intelligibility in the utterance originating direction.

4. The method of claim 1 wherein processing of the received sounds to extract a human utterance is performed using a process selected from the group consisting of frequency band processing, mel-frequency processing, time-window processing, speech recognition processing and combinations thereof.

5. The method of claim 1 wherein the direction of arrival analysis is performed using a process selected from the group consisting of a steered beam-former process, a subspace-based process, a time delay estimate process, a maximization process, a cross correlation process, a generalized cross correlation phase transform process and combinations thereof.

6. The method of claim 1 wherein the speaker array includes plural spaced apart speaker transducers and wherein the speaker array is steered by individually supplying the audio content from the aircraft audio system to each speaker transducer at controlled times based on the utterance originating direction.

7. The method of claim 1 wherein the speaker array includes plural spaced apart ultrasonic transducers and wherein the speaker array is steered by supplying each ultrasonic transducer with an ultrasonic carrier modulated to carry the audio content, and individually supplying the ultrasonic carrier to each speaker transducer with a controlled phase delay based on the utterance originating direction to produce an ultrasonic beam that is steered in the utterance originating direction.

8. The method of claim 1 further comprising:
deploying the at least two transducers within the passenger cabin the aircraft to monitor utterances from a passenger;
deploying the speaker array within the passenger cabin of the aircraft and coupling the speaker array to an in-flight entertainment system to direct audio content from the in-flight entertainment system to the passenger.

9. The method of claim 1 further comprising:
deploying the at least two transducers within the flight deck of the aircraft to monitor utterances from the pilot;
deploying the speaker array within the flight deck of the aircraft and coupling the speaker array to an avionics communication system to direct audio content from the avionics communication system to the pilot.

10. A method of controlling an aircraft cabin system of the type providing functionality at plural different selectable locations comprising:
receiving sounds within the aircraft using a microphone array of at least two transducers;
processing the received sounds to extract a human utterance;
performing direction of arrival analysis of the extracted human utterance to determine an utterance originating direction;
using the utterance originating direction to cause the cabin system to provide functionality at at least one selected location based on the utterance originating direction.

11. A system for controllably directing audio content to or from an aircraft occupant, comprising
a microphone array of at least two transducers, positioned onboard an aircraft to pick up utterances of the aircraft occupant;

an electronically steerable speaker array coupled to an onboard an aircraft audio system to supply audio content to the aircraft occupant;
a signal processor coupled to the microphone array to process utterances sensed by the at least two transducers to determine an utterance originating direction of the sensed utterance;
a controller circuit that supplies a pointing direction control signal to the steerable speaker array based on the utterance originating direction to cause the steerable speaker array to direct the audio content in the direction of the sensed utterance and thereby direct the audio content to the aircraft occupant;
the same or a separate controller circuit that supplies a pointing direction control signal to the steerable microphone array based on the utterance originating direction to cause the steerable microphone array to improve speech intelligibility in the utterance originating direction and reduces interferences or noises from other directions.

12. The system of claim 11 wherein the aircraft audio system includes an avionics communication system, and wherein microphone array and electronically steerable speaker array are positioned within the flight deck of the aircraft to monitor utterances from the pilot and to direct audio content from the avionics communication system to or from the pilot.

13. The system of claim 11 wherein the aircraft audio system is an in-flight entertainment system, and wherein microphone array and electronically steerable speaker array are positioned within the passenger cabin of the aircraft to monitor utterances from a passenger and to direct audio content from the in-flight entertainment system to the passenger.

14. The system of claim 11 wherein the signal processor includes a filter to suppress signals produced by sounds sensed by the at least two transducers that lack a characteristic of a human utterance.

15. The system of claim 14 wherein the filter suppresses signals lacking substantial energy at frequencies associated with human speech.

16. The system of claim 11 wherein at least one of the controller circuit includes a sample and hold circuit that maintains the pointing direction of the speaker system or the microphone array as a last sensed utterance until a next sensed utterance is processed.

17. The system of claim 11 wherein the signal processor preprocesses audio signals sensed by the at least two transducers to inhibit the effect of sounds not uttered by the aircraft occupant.

18. The system of claim 11 wherein the signal processor preprocesses audio signals sensed by the at least two transducers using a process selected from the group consisting of frequency band processing, mel-frequency processing, time-window processing, speech recognition processing and combinations thereof.

19. The system of claim 11 wherein the signal processor is programmed to employ a direction of arrival algorithm upon the utterances sensed by the at least two transducers, selected from the group consisting of a steered beam-former process, a subspace-based process, a time delay estimate process, a maximization process, a cross correlation process, a generalized cross correlation phase transform process and combinations thereof.

20. The system of claim 11 wherein the speaker array comprises plural spaced apart ultrasonic transducers that deliver the audio content upon a modulated ultrasonic beam.

\* \* \* \* \*